United States Patent
Niinuma et al.

(10) Patent No.: US 9,471,171 B2
(45) Date of Patent: Oct. 18, 2016

(54) IMAGE PROCESSING DEVICE AND METHOD

(71) Applicant: FUJITSU LIMITED, Kawasaki-shi, Kanagawa (JP)

(72) Inventors: Koichiro Niinuma, Kawasaki (JP); Taichi Murase, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 200 days.

(21) Appl. No.: 14/159,584

(22) Filed: Jan. 21, 2014

(65) Prior Publication Data
US 2014/0292644 A1 Oct. 2, 2014

(30) Foreign Application Priority Data
Mar. 29, 2013 (JP) ................. 2013-070893

(51) Int. Cl.
G06F 3/01 (2006.01)
G06F 3/041 (2006.01)
G06K 9/00 (2006.01)
G06F 3/0488 (2013.01)

(52) U.S. Cl.
CPC .......... G06F 3/0416 (2013.01); G06F 3/0488 (2013.01); G06K 9/00375 (2013.01)

(58) Field of Classification Search
None
See application file for complete search history.

(56) References Cited

U.S. PATENT DOCUMENTS

| 2009/0034813 | A1* | 2/2009 | Dikmen | G06T 7/0044 |
| | | | | 382/131 |
| 2010/0215235 | A1* | 8/2010 | Yoon | G06K 9/00369 |
| | | | | 382/131 |
| 2011/0081045 | A1* | 4/2011 | Lee | G06K 9/00362 |
| | | | | 382/103 |
| 2013/0236089 | A1* | 9/2013 | Litvak | G06K 9/00382 |
| | | | | 382/154 |

OTHER PUBLICATIONS

Arya et al, "An Optimal Algorithm for Approximate Nearest Neighbor Searching in Fixed Dimensions," 1998, Journal of the ACM, vol. 45, No. 6, pp. 891-923.*
C. Prema et al., "Survey on Skin Tone Detection using Color Spaces", International Journal of Applied Information Systems 2 (2), pp. 18-26, May 2012.
Ahmed Elgammal et al., "Skin Detection—a Short Tutorial", Encyclopedia of Biometrics by Springer-Verlag Berlin Heidelberg 2009.
P. Kakumanu et al., "A survey of skin-color modeling and detection methods", Pattern Recognition, vol. 40, Issue 3, pp. 1106-1122, Mar. 2007.
Vladimir Vezhnevets et al., "A Survey on Pixel-Based Skin Color Detection Techniques", In Proc. GRAPHICON—2003.
Navneet Dalal et al., "Histograms of Oriented Gradients for Human Detection", IEEE Computer Society Conference on Computer Vision and Pattern Recognition (CVPR'05), 2005.

* cited by examiner

*Primary Examiner* — David F Dunphy
(74) *Attorney, Agent, or Firm* — Staas & Halsey LLP

(57) ABSTRACT

An image processing device includes a processor a processor; and a memory which stores a plurality of instructions, which when executed by the processor, cause the processor to execute: detecting a first candidate group and a second candidate group contained in the image, the first candidate group being one or more candidates for a first part of a user, the second candidate group being one or more candidates for a second part of the user; and selecting at least one of the first part in the first candidate group and the second part in the second candidate group, on the basis of a human-body's positional relationship of the first part and the second part.

19 Claims, 11 Drawing Sheets

FIG. 3

| LOCATION OF BASE OF FINGER (x,y) | LOCATION OF FINGERTIP (x,y) | POINTING DIRECTION OF FINGERTIP (deg.) | HOG FEATURE AMOUNT | |
|---|---|---|---|---|
| (20,80) | (20,20) | 0 | BLOCK 1 | INTENSITY of GRADIENT 1 : 3 |
| | | | | INTENSITY of GRADIENT 2 : 24 |
| | | | | INTENSITY of GRADIENT 3 : 15 |
| | | | | ⋮ |
| | | | | INTENSITY of GRADIENT 9 : 10 |
| | | | BLOCK 2 | INTENSITY of GRADIENT 1 : 1 |
| | | | | INTENSITY of GRADIENT 2 : 5 |
| | | | | INTENSITY of GRADIENT 3 : 53 |
| | | | | ⋮ |
| | | | | INTENSITY of GRADIENT 9 : 30 |
| | | | ⋮ | ⋮ |
| | | | BLOCK n | INTENSITY of GRADIENT 1 : 20 |
| | | | | INTENSITY of GRADIENT 2 : 4 |
| | | | | INTENSITY of GRADIENT 3 : 6 |
| | | | | ⋮ |
| | | | | INTENSITY of GRADIENT 9 : 13 |

30

FIG. 9
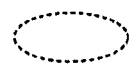 : FIRST PART
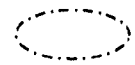 : SECOND PART
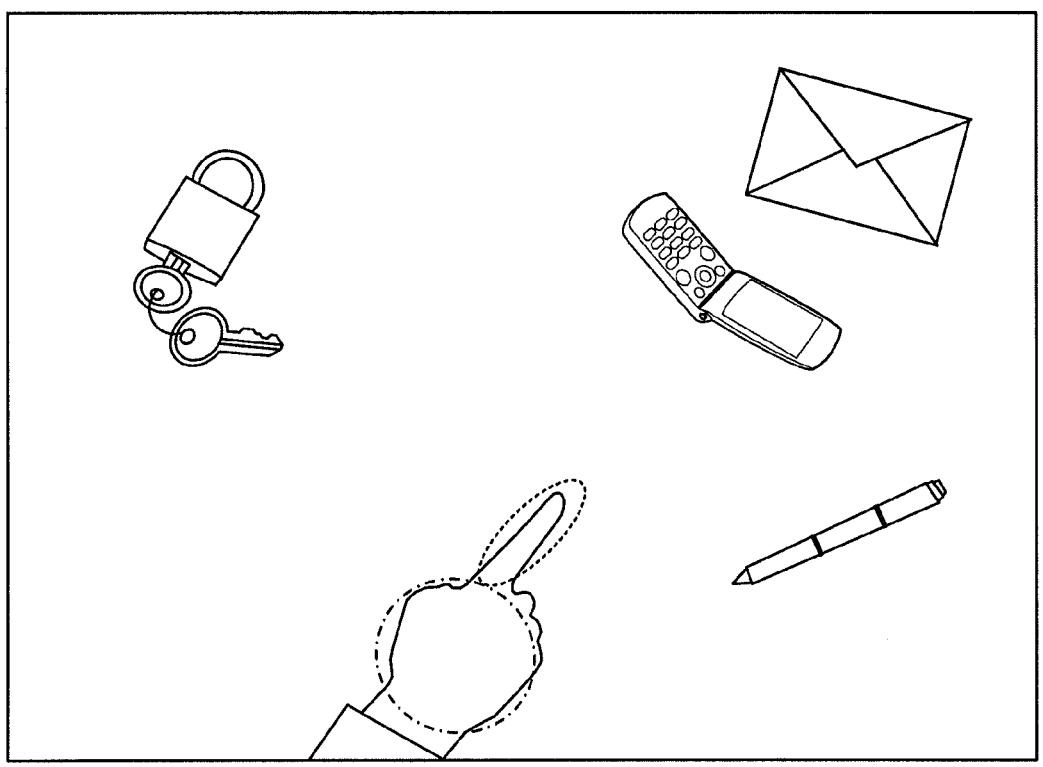

IMAGE PROCESSING DEVICE AND METHOD

CROSS-REFERENCE TO RELATED APPLICATION

This application is based upon and claims the benefit of priority from the prior Japanese Patent Application No. 2013-070893 filed on Mar. 29, 2013, the entire contents of which are incorporated herein by reference.

FIELD

The embodiments discussed herein are related to an image processing device, method and program which are used to detect, for example, a user's finger.

BACKGROUND

In the past, methods of projecting a document image by using a projector have been utilized. In addition, techniques for enabling a projected image to be interactively operated have recently been developed, for the purpose of supporting users' work. As one example of these techniques, an augmented reality (AR) technique has been disclosed. In this technique, for example, when a user points his or her finger at a predetermined word contained in a projected image, a comment linked to this word appears in the image.

The above technique relies on a fixed or movable camera as an interface to pinpoint the location of a user's finger. A method of pinpointing the location of a user's finger employs, for example, a technique through which skin color components (color feature amounts) are extracted from a captured image so that the contour of a hand region in the image is extracted, and the location of a user's hand in this region is identified. Exemplary documents that describe such a method are listed below:

C. Prema et al., "Survey on Skin Tone Detection using Color Spaces", *International Journal of Applied Information Systems* 2(2), published by Foundation of Computer Science, New York, USA, pages 18-26, May 2012; Ahmed et al., "Skin Detection—a Short Tutorial", *Encyclopedia of Biometrics* by Springer-Verlag, Heidelberg, Berlin, 2009; Kakumanu et al., "A survey of skin-color modeling and detection methods", *Pattern Recognition*, Volume 40, Issue 3, Pages 1106-1122, March 2007; and Vladimir et al., "A Survey on Pixel-Based Skin Color Detection Techniques", *PROC. GRAPHICON* 2003.

SUMMARY

In accordance with an aspect of the embodiments, an image processing device includes a processor a processor; and a memory which stores a plurality of instructions, which when executed by the processor, cause the processor to execute: detecting a first candidate group and a second candidate group contained in the image, the first candidate group being one or more candidates for a first part of a user, the second candidate group being one or more candidates for a second part of the user; and selecting at least one of the first part in the first candidate group and the second part in the second candidate group, on the basis of a human-body's positional relationship of the first part and the second part.

The object and advantages of the embodiments will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 3 is an exemplary table illustrating a structure of data concerning the first feature amount model;

FIG. 9 schematically illustrates an image, acquired by the acquisition unit, in which the selection unit selects a first part and a second part;

DESCRIPTION OF EMBODIMENTS

Hereinafter, a description will be given of an exemplary image processing device, method and program according to one embodiment, with reference to the accompanying drawings. Note that this embodiment is not intended to restrict the disclosed technique.

(First Embodiment)

Figure 1:
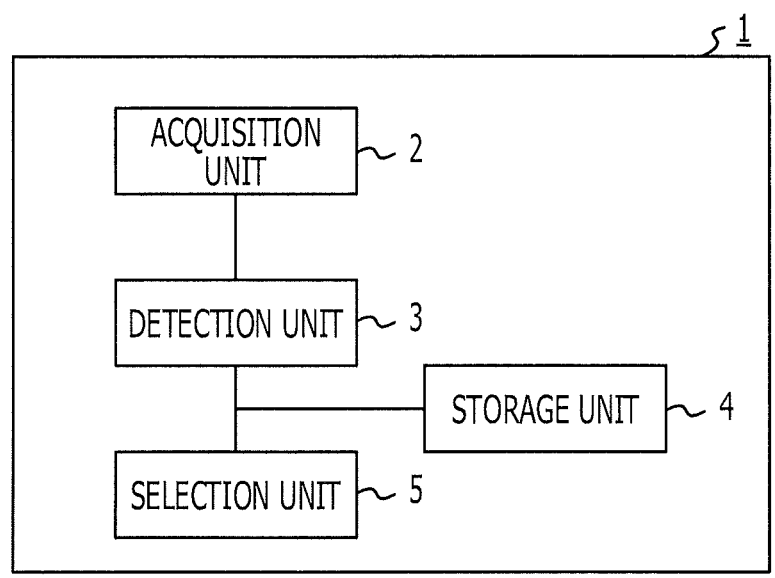
FIG. 1 is a functional block diagram illustrating an image processing device according to one embodiment.

FIG. 1 is a functional block diagram illustrating an image processing device 1 according to one embodiment. The image processing device 1 includes an acquisition unit 2, a detection unit 3, a storage unit 4, and a selection unit 5. The image processing device 1 further includes a communicating unit (not illustrated). The image processing device 1 transmits/receives data to or from various external devices through this communicating unit, and utilizes various network resources.

The acquisition unit 2 is implemented using, for example, hardware configured with a wired logic circuit. Alternatively, the acquisition unit 2 may be a functional module implemented using a computer program executable by the image processing device 1. The acquisition unit 2 receives a captured image from an external device. The external device that captures an image may be, for example, an image pickup device. Examples of the image pickup device include, but are not limited to, a charge coupled device (CCD) camera and a complementary metal oxide semiconductor (CMOS); the image pickup device may be used in the form of a head mounted camera (HMC) or may be built into the image processing device 1 as appropriate. The image captured by this image pickup device contains, for example, a user's hand. The acquisition unit 2 outputs this acquired image to the detection unit 3.

The detection unit 3 is implemented using, for example, hardware configured with a wired logic circuit. Alternatively, the detection unit 3 may be a functional module implemented using a computer program executable by the image processing device 1. The detection unit 3 receives an image from the acquisition unit 2, and detects a first candidate group and a second candidate group from the image. The first and second candidate groups will become candidates for a first part and a second part, respectively, of a user. For example, the first part is a user's finger; the second part is the back or palm of a user's hand. In the following description of the first embodiment, the second part is the back of a hand. Details of the detection process performed by the detection unit 3 will be described later.

Examples of the storage unit 4 include: but are not limited to, a semiconductor memory device, such as a flash memory, a random access memory (RAM) or a read only memory (ROM); and a storage device, such as a hard disk drive (HDD) or an optical disc drive.

The storage unit 4 does not necessarily have to be provided in the image processing device 1. Alternatively, the storage unit 4 may be provided in an external device provided outside the image processing device 1. In this case, the storage unit 4 and the image processing device 1 are interconnected through the communicating unit (not illustrated) and a communication line. In addition, for example, a cache or memory (not illustrated) in each functional unit provided in the image processing device 1 may be used to store various data, instead of the storage unit 4.

The storage unit 4 stores, for example, a first feature amount model and a second feature amount model in advance through pre-learning. The first and second feature amount models are generated by extracting feature amounts from the first and second parts, respectively, in advance. The first and second feature amount models may be generated on the basis of histogram of oriented gradients (HOG) feature amounts or local binary patterns (LBP) feature amounts. In the first embodiment, the first and second feature amount models are generated on the basis of the HOG feature amounts. The pre-learning is conducted using, for example, images (positive images) that contain objects (the first and second parts) and an image (negative image) that does not contain these objects, and may employ a known method including Adaboost and support vector machines (SVM). The extraction method using the HOG feature amounts may employ a method disclosed in the following document; Navneet et al., "Histograms of Oriented Gradients for Human Detection", *IEEE Computer Society Conference on Computer Vision and Pattern Recognition* (CVPR'05), 2005.

Figure 2:
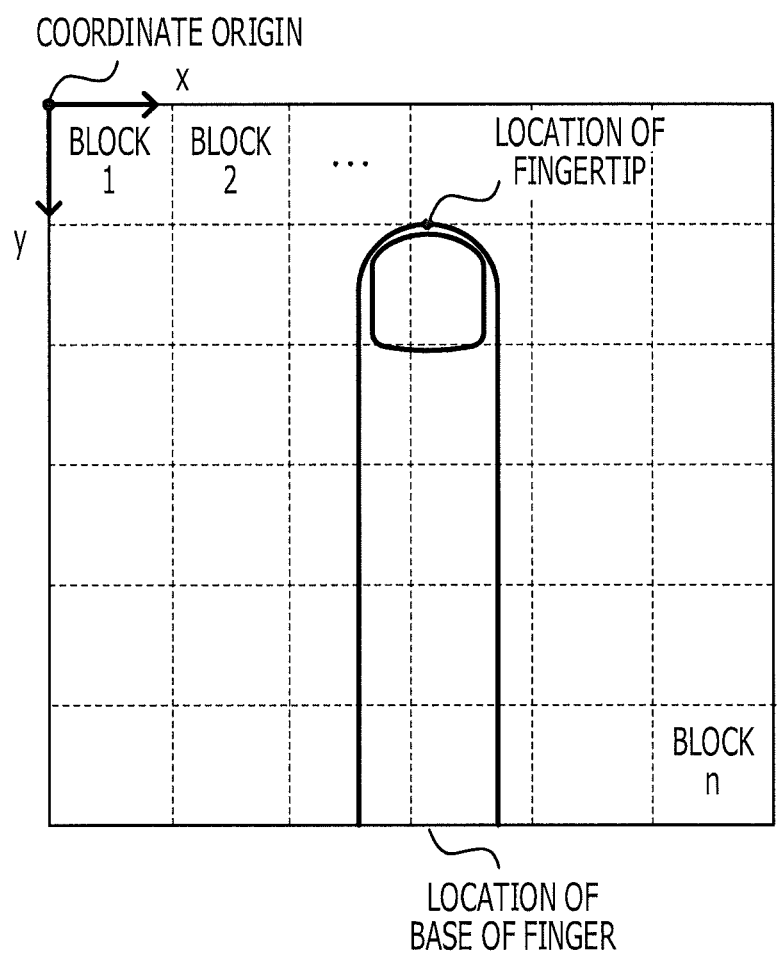
FIG. 2 schematically illustrates a positive image of a first feature amount model.

FIG. 2 schematically illustrates a positive image of the first feature amount model. In the positive image illustrated in FIG. 2, for example, the upper left corner is set as an origin; the lateral and vertical sides are defined as x and y axes, respectively. The positive image is made up of an arbitrary number of blocks, and contains an upright user's finger which becomes a first part. As the positive image in FIG. 2, for example, multiple positive images that contain the first parts of different users or have different lighting conditions or backgrounds may be used. In the case where the pre-learning is conducted using these positive images, it is preferable that the fingertips in the images be uniquely set on the same coordinates. In this case, even when any of first feature amount models extracted from the multiple positive images is used, it is possible to closely align an actually detected fingertip with that in the positive image, thereby pinpointing the location of the user's finger. Moreover, in the positive image illustrated in FIG. 2, the location of the base of a finger may be set as appropriate. For example, the center of the lower side of the image containing the finger may be set as the location of the base of a finger.

FIG. 3 is an exemplary table illustrating a structure of data concerning the first feature amount model. A table 30 in FIG. 3 stores data with items "LOCATION OF BASE OF FINGER", "LOCATION OF FINGERTIP", "POINTING DIRECTION OF FINGERTIP", and "HOG FEATURE AMOUNT". The item "HOG FEATURE AMOUNT" further has items "BLOCK NUMBER" and "GRADIENT INTENSITY". The item "BLOCK NUMBER" indicates block numbers in FIG. 2; the item "GRADIENT INTENSITY" indicates a gradient intensity for each of nine regions defined by separating each block. Each gradient intensity is normalized by using, for example, 1 to 64 values. The x and y coordinates described with reference to FIG. 2 are assigned to the items "LOCATION OF BASE OF FINGER" and "LOCATION OF FINGERTIP". The pointing direction of a fingertip may be normalized on the basis of a difference between the respective x coordinates of the locations of the base of a finger and a fingertip.

Figure 4:
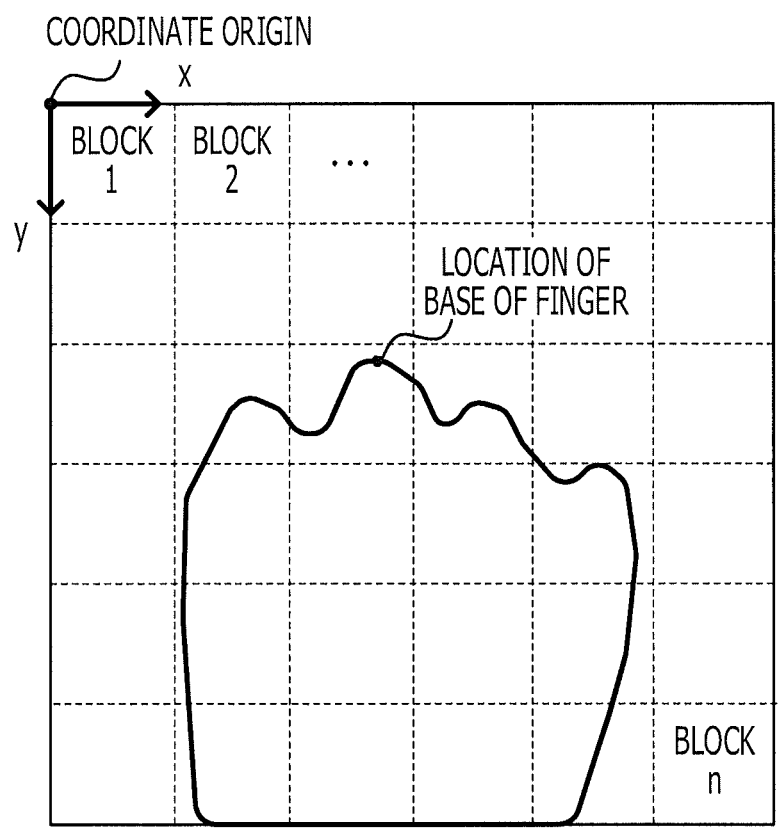
FIG. 4 schematically illustrates a positive image of a second feature amount model.

FIG. 4 schematically illustrates a positive image of the second feature amount model. In the positive image illustrated in FIG. 4, for example, the upper left corner is set as an origin; the lateral and vertical sides are defined by x and y axes, respectively. The positive image is made up of an arbitrary number of blocks, and contains the back of a user's hand which becomes a second part. As the positive image in FIG. 4, for example, multiple positive images that contain second parts of different users or different lighting conditions or backgrounds may be used. Moreover, in the positive image illustrated in FIG. 4, the location of the base of the finger is set as appropriate. For example, the center of one of the carpal bones at which fingers are connected to the back of the hand may be set as the location of the base of the finger.

Figure 5:
FIG. 5 is an exemplary table illustrating a structure of data concerning the second feature amount model.

FIG. 5 is an exemplary table illustrating a structure of data concerning the second feature amount model. A table 50 in FIG. 5 stores data with items "LOCATION OF BASE OF FINGER", "LOCATION OF FINGERTIP", and "HOG FEATURE AMOUNT". Since the positive image in FIG. 4 does not contain a fingertip, the location of a fingertip which is assigned to the table 50 may be virtually determined, for example, on the basis of a difference (60) between the respective y coordinates of the locations of the fingertip and the base of the finger which are stored in the table 30 in FIG. 3. For this reason, the y coordinate of the location of the fingertip has a negative value (−40) in the table 50 in FIG. 5. The other data items of the table 50 in FIG. 5 are the same as those of the table 30 in FIG. 3, and a detailed description about them accordingly will be skipped.

Figure 6:
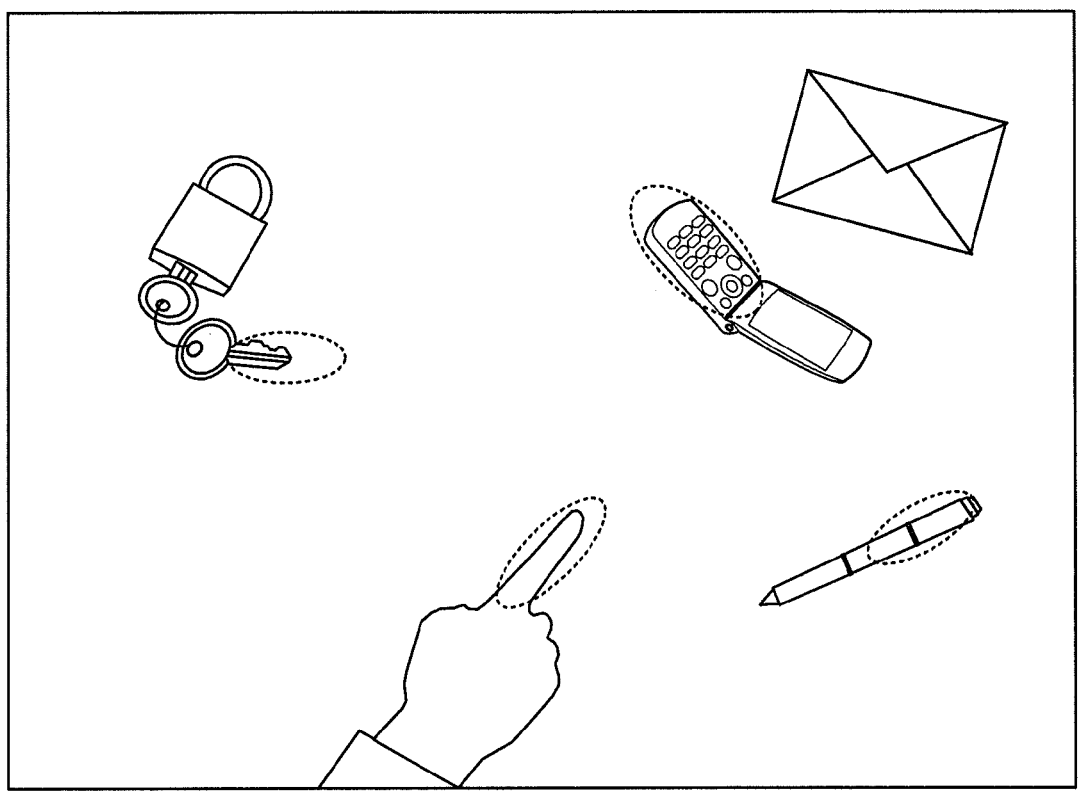
FIG. 6 schematically illustrates an image, acquired by the acquisition unit, that contains a detected first candidate group.

The detection unit 3 in FIG. 1 extracts HOG feature amounts from the image received from the acquisition unit 2. Then, the detection unit 3 compares the extracted HOG feature amounts with those of a first feature amount model stored in the storage unit 4, and detects, as a first candidate group, an object in the image which has similarity of equal to or more than a preset first threshold, such as 70%. FIG. 6 schematically illustrates an image, acquired by the acquisition unit 2, that contains a detected first candidate group. As illustrated in FIG. 6, the image acquired by the acquisition unit 2 contains a user's hand, a pen, a key, a portable phone, and an envelope. In the first embodiment, a user's finger, the end of the pen opposite the nib, an end of the key, and the numeric keypad of the portable phone are detected by the detection unit 3, as the first candidate group. In this case, the detection unit 3 may use color feature amounts in combination with the HOG feature amounts, in detecting the first candidate group. Using a combination of the HOG feature amounts and color feature amounts enables the decrease in the number of candidates constituting the first candidate group to be detected by the detection unit 3. Likewise, the detection unit 3 compares the HOG feature amounts that have been extracted from the image received from the acquisition unit 2 with HOG feature amounts of the second feature amount model which are stored in the storage unit 4. Then, the detection unit 3 detects, as a second candidate group, an object contained in the image which has similarity of equal to or more than a preset second threshold, such as 70%. Here, the second candidate group is not illustrated.

The selection unit 5 in FIG. 1 is implemented using, for example, hardware configured with a wired logic circuit. Alternatively, the selection unit 5 may be configured with a functional module implemented using a computer program executable by the image processing device 1. The selection unit 5 selects a first part and a second part from the first and second candidate groups, respectively, on the basis of a human-body's positional relationship between first and second parts. One example of the human-body's positional relationship is that one end of a first part is movably connected to the rim of a second part at a connecting point, more specifically, the base of a user's finger (also referred to as the connecting point) is connected to the back of a user's hand.

Figure 7:
FIG. 7 is an exemplary table illustrating a structure of search region data.

The storage unit 4 in FIG. 1 further stores search region data based on the human-body's positional relationship, by which a second part is detected on the basis of a predetermined reference location of a first part. FIG. 7 is an exemplary table illustrating a structure of the search region data. A table 70 in FIG. 7 stores data with items, for example, "REFERENCE LOCATION", "LOCATION SEARCH RANGE", "REFERENCE ANGLE", "ANGLE SEARCH RANGE", "REFERENCE SCALE", and "SCALE SEARCH RANGE". Each item in the table 70 in FIG. 7 is specified on the basis of the human-body's positional relationship in which a user's finger is connected to the back of a user's hand. Moreover, it is specified on the basis of a relative movable range of a user's finger and the back of a user's hand. Using the data having the above items enables the locations of fingers to be detected robustly, even when multiple hands of different shapes are contained in an image.

The item "REFERENCE LOCATION" in the table 70 in FIG. 7 corresponds to a reference location applied to the back of the hand; for example, the coordinates assigned to the item "LOCATION OF BASE OF FINGER" in the table 50 in FIG. 5 may be stored as the reference location. The item "LOCATION SEARCH RANGE" corresponds to a search range for the first part, relative to the reference location; it is specified in the x and y directions. The selection unit 5 determines whether or not a second candidate group has been detected within a range of reference location±location search range (20±10, 20±20).

Figure 8A:
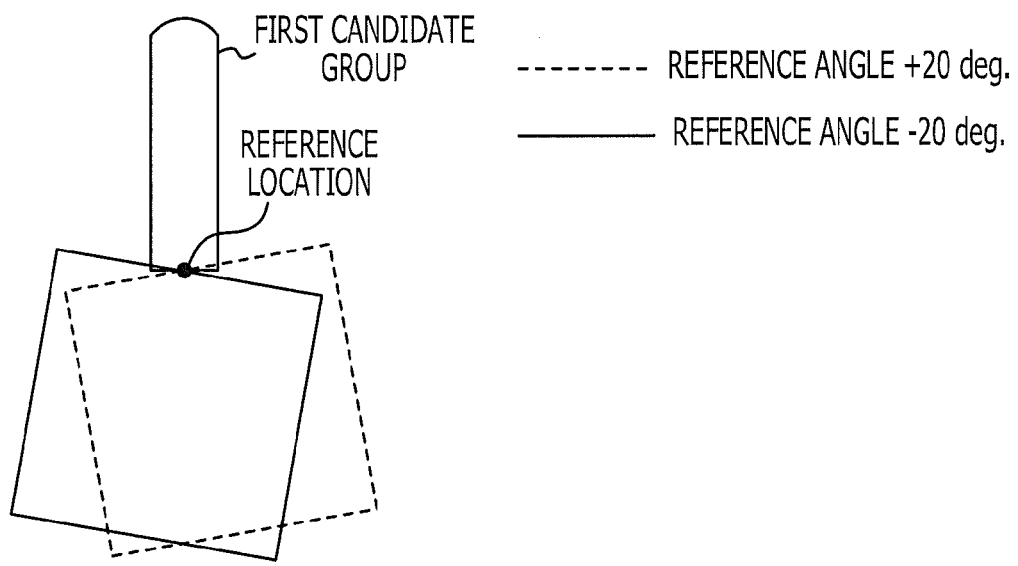
FIG. 8A schematically illustrates an angle range of a search region for a single first candidate group.

The item "REFERENCE ANGLE" in the table 70 in FIG. 7 corresponds to a reference angle applied to the back of a hand; the reference angle may be specified by, for example, a difference between the respective x coordinates assigned to the items "LOCATION OF BASE OF FINGER" and "LOCATION OF FINGERTIP" in the table 50 in FIG. 5. The item "ANGLE SEARCH RANGE" in the table 70 in FIG. 7 corresponds to a search range for the first part, relative to a reference angle. FIG. 8A schematically illustrates an angle range of a search region for a single first candidate group. As illustrated in FIG. 8A, the selection unit 5 determines whether or not a second candidate group has been detected within a region of reference angle±angle search range (0±20) that is defined by using the reference location as a base point.

Figure 8B:
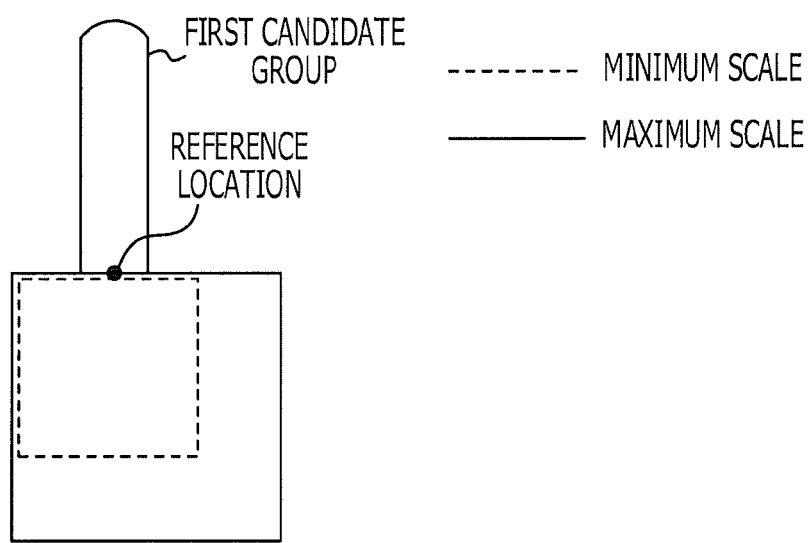
FIG. 8B schematically illustrates a scale range of a search region for a single first candidate group.

The item "REFERENCE SCALE" in the table 70 in FIG. 7 corresponds to a reference scale applied to the back of the hand (or the size of the back of the hand); the reference scale may be specified by, for example, a difference between the respective y coordinates assigned to the items "LOCATION OF BASE OF FINGER" and "LOCATION OF FINGERTIP" in the table 50 in FIG. 5. The item "SCALE SEARCH RANGE" corresponds to a search range based on the reference scale; the minimum and maximum of this search range may be, for example, 0.7 times and 1.3 times, respectively, of the reference scale. FIG. 8B schematically illustrates a scale range of a search region for a single first candidate group. As illustrated in FIG. 8B, the selection unit 5 determines whether or not the second candidate group has been detected within the scale search range defined by using the reference location as a base point.

For example, the selection unit 5 in FIG. 1 refers to the table 70 in FIG. 7 to check whether or not a second candidate group is present within a search region based on a first candidate group detected by the detection unit 3. Then, the selection unit 5 selects first and second parts from the first and second candidate groups, respectively. The selection unit 5 may selectively use the items in the table 70 in FIG. 7, or some of them in combination. If an image acquired by the acquisition unit 2 contains both the first and second parts, as illustrated in FIG. 6, a second candidate group is present within a search region, and the selection unit 5 selects the second part. On the other hand, if no second feature group has been detected because, for example, an image acquired by the acquisition unit 2 contains only a first part, the detection unit 3 and the selection unit 5 perform the detection and selection processes, respectively, for an image that the acquisition unit 2 has acquired at a different time (or an image of the next frame).

FIG. 9 schematically illustrates an image, acquired by the acquisition unit 2, in which the selection unit 5 selects a first part and a second part. Since the selection is made on the basis of a constraint in which a user's finger is connected to the back of a user's hand, the selection unit 5 is less likely to erroneously detect, as the user's finger, another part in the first candidate group, such as the end of the pen opposite the nib, the end of the key, or the numeric keypad of the portable phone, that the detection unit 3 has detected. In addition, the selection unit 5 in FIG. 1 is able to precisely determine the location of the fingertip in the image from the selected first part, on the basis of a relationship of the data of items "LOCATION OF FINGERTIP" and "POINTING DIRECTION OF FINGERTIP" in the table 30 in FIG. 3, and the origin (for example, the upper left corner) of the image acquired by the acquisition unit 2. Simple feature amount models are applicable to the first and second parts, because a finger and the back of a hand that become the first and second parts, respectively, have simple shapes and structures that are independent of the influence of the movable region of the hand. As a result, the storage capacity of the image processing device 1 decreases, and a load on the calculation processing performed by the image processing device 1 is lightened. Using hand feature models of different shapes, as comparative examples, which are created by virtue of the HOG or LBG feature amounts are possible. In this case, however, using a sufficient number of hand feature models for a hand having a flexible movable region is not realistic in terms of a storage capacity and a calculation load. In contrast, using a small number of hand feature models may result in the detection failure of a user's finger and the lowering of the detection precision due to the rough positional estimation. However, the image processing device in the first embodiment successfully reduces this risk.

In the first embodiment, the detection unit 3 detects a first candidate group and a second candidate group, and selection unit 5 then selects a first part and a second part. In this case, after the detection unit 3 detects a first candidate group, the selection unit 5 may cause the detection unit 3 to detect a second candidate group on the basis of a search region. This enables the reduction in a load on the processing performed by the image processing device 1. Alternatively, after the detection unit 3 detects a second candidate group, the selection unit 5 may cause the detection unit 3 to detect a first candidate group on the basis of a search region. This also enables the reduction in a processing load placed on the image processing device 1.

Although only one user's finger is present in the images in FIGS. 6 and 9, there are cases where two or more user's fingers are present therein. Even in this case, the selection unit 5 simply has to select multiple parts corresponding to the single second part, as first parts, because the ends of multiple first parts are assumed to be connected to the rim of a single second part. Determining whether or not the back of only one hand, which becomes a second part, is present may be made by calculating similarity using the location, angle and scale of a second candidate group selected by the selection unit 5. For example, it is possible to determine (or estimate) that multiple first parts correspond to a single second part, if a candidate A2 in a second candidate group which corresponds to a candidate A1 in a first candidate group and a candidate B2 in the second candidate group which corresponds to a candidate B1 in the first candidate group satisfy the following equation, $$(x1-x2)^2+(y1-y2)^2<TH1$$

$$|a1-a2|<TH2$$

$$|w1-w2|<TH3,$$

where: (x1, y1) denote coordinates of the central location of A2; a1 denotes an angle which the central location of A2 forms with an origin of an image; w1 denotes a width of A2; (x2, y2) denote coordinates of the central location of B2; a2 denotes an angle which the central location of B2 forms with the origin of the image; w2 denotes a width of B2; and TH1, TH2 and TH3 denote arbitrary thresholds. If multiple first parts selected correspond to a single second part, it is preferable for the selection unit 5 to integrate these first parts by subjecting them to a labeling process.

The image processing device 1 may be configured with an integrated circuit (IC), including an application specific integrated circuit (ASIC) and a field programmable gate array (FPGA).

Figure 10:
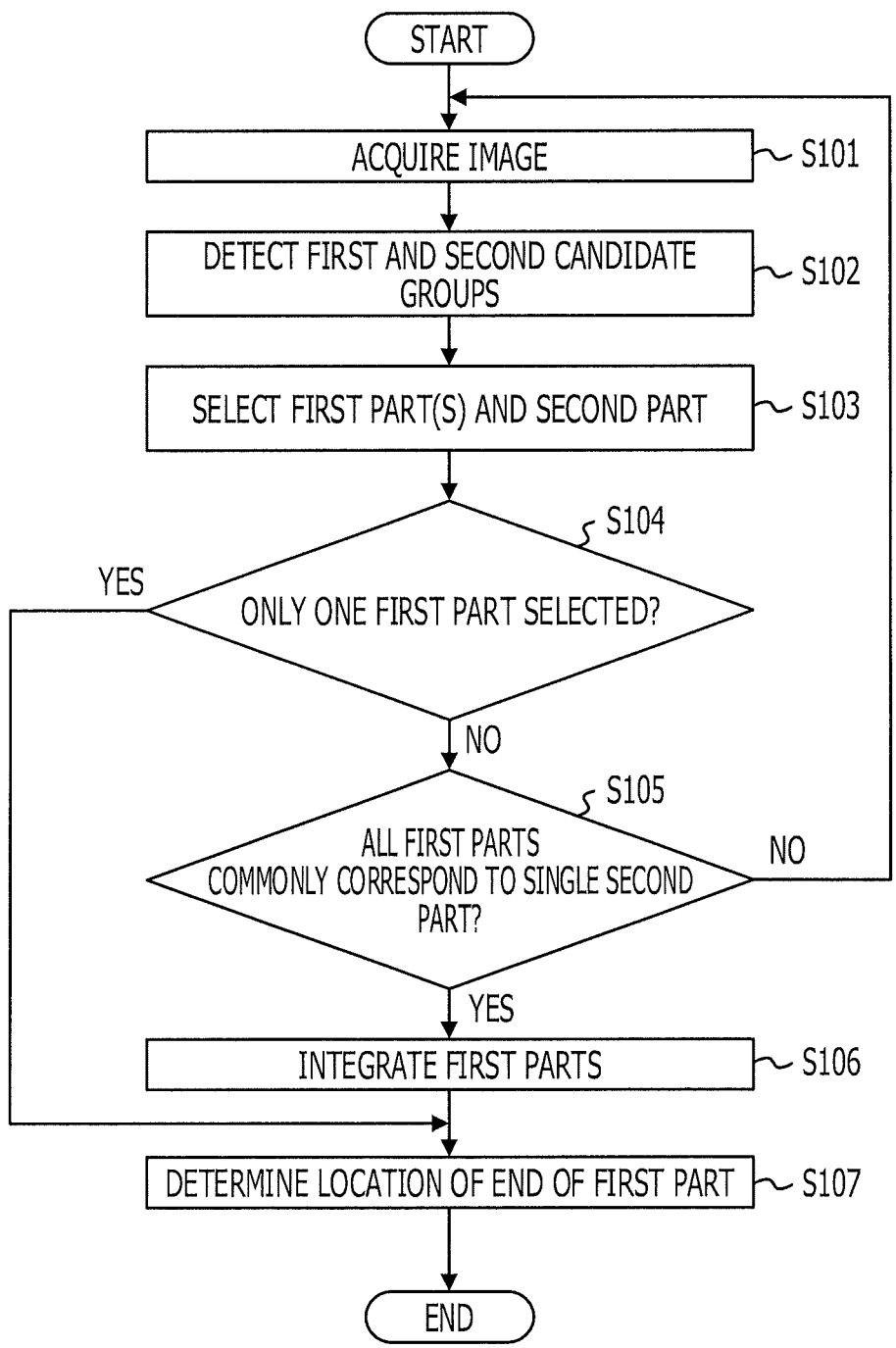
FIG. 10 is a flowchart of an image process performed by the image processing device.

FIG. 10 is a flowchart of an image process performed by the image processing device 1. The acquisition unit 2 receives a captured image from, for example, an image pickup device (Step S101). The acquisition unit 2 outputs the acquired image to the detection unit 3. The detection unit 3 receives the image from the acquisition unit 2. Then, the detection unit 3 employs the above method to detect first and second candidate groups from the image by using first and second feature amount models (Step S102). Here, the first candidate group is a candidate for a first part of a user; the second candidate group is a candidate for a second part of the user. As not illustrated in a figure but if no second feature group has been detected at Step S102, the acquisition unit 2 acquires an image at a different time (for example, an image of the next frame) (Step S101), and the detection unit 3 performs the process of Step S102 again.

The selection unit 5 employs the above method to select one or more first parts and a second part in the first and second candidate groups, on the basis of the human-body's positional relationship between first and second parts (Step S103). The selection unit 5 determines whether only one first part has been selected or not (Step S104). If only one first part has been selected (Step S104-Yes), the selection unit 5 determines the location of the first part in the image, on the basis of a relationship of the data of items "LOCATION OF FINGERTIP" and "POINTING DIRECTION OF FINGERTIP" in the table 30 in FIG. 3, and the origin (for example, the upper left corner edge) of the image acquired by the acquisition unit 2 (Step S107).

If multiple first parts have been selected at Step S104 (Step S104—No), the selection unit 5 determines whether the first parts commonly correspond to the single second part (Step S105). This determination method is made, for example, through the above equations. If none of the first parts commonly correspond to the single second part (Step S105—No), the image processing device 1 repeats the processes of Steps S101 to S105. If some of the first parts commonly correspond to the single second part (Step S105-Yes), the selection unit 5 integrates these first parts by subjecting them to a labeling process (Step S106). The selection unit 5 determines the locations of the ends of the arbitrary labeled first parts (the locations of arbitrary fingertips) in the images (Step S107). Then, the selection unit 5 terminates the processing of the flowchart in FIG. 10.

The image processing device 1 in the first embodiment, as described above, successfully determines the location of a user's finger precisely, without being affected by the variation in ambient lighting or background colors.

(Second Embodiment)

Figure 11:
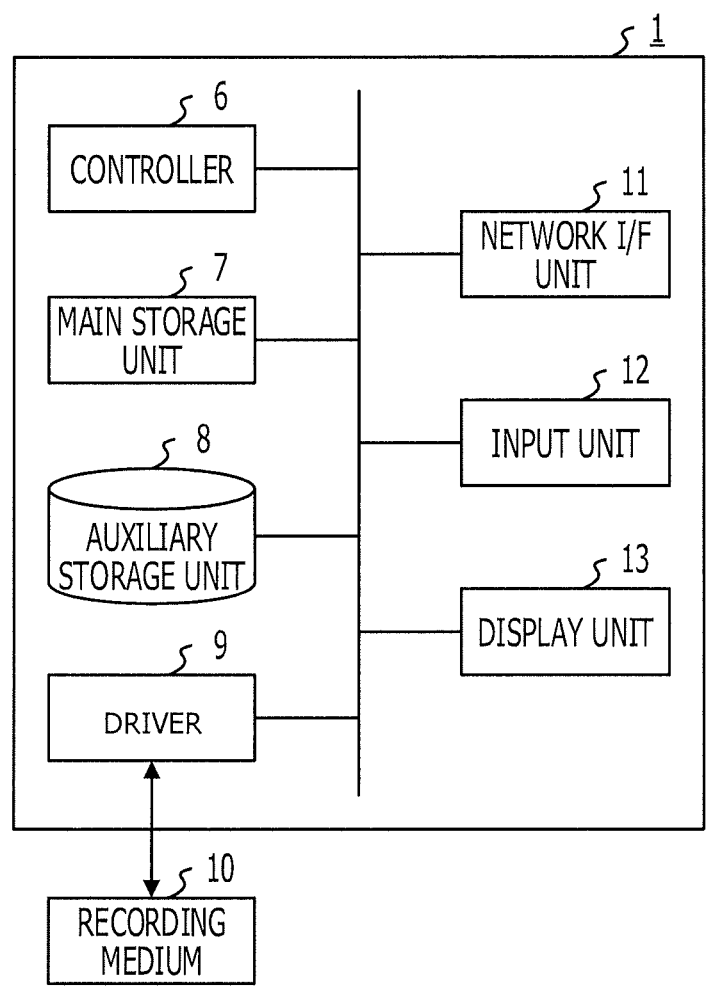
FIG. 11 illustrates a hardware configuration of the image processing device according to one embodiment.

FIG. 11 illustrates a hardware configuration of the image processing device 1 in one embodiment. As illustrated in FIG. 11, the image processing device 1 includes a controller 6, a main storage unit 7, an auxiliary storage unit 8, a driver 9, a network I/F unit 11, an input unit 12, and a display unit 13. These components are interconnected by a bus, so that they mutually transmit or receive data.

The controller 6 is a central processing unit (CPU) in a computer which controls various devices and which calculates and processes data. In addition, the controller 6 is a computing device that executes programs stored in the main storage unit 7 and the auxiliary storage unit 8. The controller 6 receives data from the input unit 12 or a storage device, calculates and processes the data, and outputs the data to the display unit 13 or the storage device.

The main storage unit 7 is implemented using, for example, a ROM or RAM, and is a storage device that memories or temporarily storages programs and data in an elementary software, such as an operating system (OS), and application software to be executed by the controller 6.

The auxiliary storage unit 8 is implemented using, for example, a HDD, and is a storage device that stores data related to the application software and the like.

The driver 9 reads a program from a storage medium such as a flexible disk, and installs it in the auxiliary storage unit 8. Specifically, a predetermined program is stored in the recording medium 10, and the driver 9 installs this program in the image processing device 1. The installed program becomes executable by the image processing device 1.

The network I/F unit 11 is an interface between the image processing device 1 and a peripheral device equipped with a communication function which are interconnected by a network. This network is, for example, a local area network (LAN) or a wide area network (WAN), and is configured with a data transmission line including a wired or wireless communication circuit.

The input unit 12 has, for example, a keyboard including cursor keys, numerical input keys, and various function keys, and a mouth and a slide pad used to select a key or the like through a screen of the display unit 13. The input unit 12 is a user interface, for example, through which a user gives the controller 6 an operating instruction and inputs data.

The display unit 13 is configured with, for example, a cathode ray tube (CRT) or a liquid crystal display (LCD), and displays an image in accordance with display data received from the controller 6.

The image processing method described above may be implemented using a program executable by a computer. This program is installed from a server or the like to the computer and is executed by the computer, so that the image processing method is performed.

By using a computer or a portable phone, the above program may be read from the recording medium 10 and is executed, so that the image processing method is also performed. Various types of recording media may be used as the recording medium 10; examples of the recording medium 10 include a recording medium that stores information in an optical, electrical or magnetic manner, such as a CD-ROM, a flexible disk or a magnetic optical disk, and a semiconductor memory that electrically stores information, such as a ROM or flash memory.

The constituent elements in each device do not necessarily have to be physically configured as in the drawings. The specific separation or integration of the devices is not limited to that in the drawings; each or some of the devices may be functionally or physically separated or integrated, depending on their individual loads, usage conditions or the like. The processes described in the embodiments may be performed by a computer, such as a personal computer or workstation, executing a program prepared in advance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
    a processor; and
    a memory which stores a plurality of instructions, which when executed by the processor, cause the processor to execute:
        acquiring an image which contains a body part of a user and an object other than the body part, wherein the body part includes a first part and a second part which respectively connect at a joint of the user;
        storing a first feature amount model and a second feature amount model, the first feature amount model including a feature amount individually extracted in advance from the first part, the second feature amount model including a feature amount individually extracted in advance from the second part;
        detecting, by using the first feature amount model and the second feature amount model, a first candidate group and a second candidate group contained in the image, the first candidate group being one or more candidates for the first part, the second candidate group being one or more candidates for the second part, wherein the first candidate group and the second candidate group are detected separately; and
        identifying at least one of the first part in the first candidate group and the second part in the second candidate group by checking whether or not the second candidate group is present within a search range that is defined by using a reference location for the first candidate group as a base point.

2. The image processing device according to claim 1, further comprising:
    storing a first feature amount model and a second feature amount model, the first feature amount model including a feature amount extracted in advance from the first part, the second feature amount model including a feature amount extracted in advance from the second part,
    wherein the detecting includes:
    detecting, as a part of the first candidate group, an object contained in the image and having a similarity to the first feature amount model which is equal to or more than a preset first threshold; and
    detecting, as a part of the second candidate group, an object contained in the image and having a similarity to the second feature amount model which is equal to or more than a preset second threshold.

3. The image processing device according to claim 2,
    wherein the storing includes storing the first feature amount model and the second feature amount model that are based on a histogram oriented gradients (HOG) feature amount or a local binary patterns (LBP) feature amount, and
    wherein the detecting includes detecting the first candidate group and the second candidate group by using the HOG feature amount or the LBP feature amount.

4. The image processing device according to claim 3,
    wherein the detecting includes detecting the first candidate group and the second candidate group by further using a color feature amount.

5. The image processing device according to claim 1,
    wherein the relative movable range is that an end of the first part is movably connected to a rim of the second part at a connecting point.

6. The image processing device according to claim 1,
    wherein the checking includes referring to a table that stores the search range and the reference location which are associated with each other, and the table stores an angle search range and a reference angle which are associated with each other, and a scale search range and a reference scale which are associated with each other.

7. The image processing device according to claim 1, further comprising:
    acquiring an image containing the first part and the second part of the user;
    wherein the first part is a finger, and the second part is a back or palm of a hand.

8. The image processing device according to claim 1,
wherein if the first part includes a plurality of first parts and each of the plurality of first parts has an end connected to a rim of the second part, the selecting includes selecting the plurality of first parts, as the first part corresponding to the second part.

9. The image processing device according to claim 1,
wherein the selecting includes determining a location of an end of the first part in the image.

10. An image processing method comprising:
acquiring an image which contains a body part of a user and an object other than the body part, wherein the body part includes a first part and a second part which respectively connects at a joint of the user;
storing a first feature amount model and a second feature amount model, the first feature amount model including a feature amount individually extracted in advance from the first part, the second feature amount model including a feature amount individually extracted in advance from the second part,
detecting, by using the first feature amount model and the second feature amount model, a first candidate group and a second candidate group contained in the image, the first candidate group being one or more candidates for the first part, the second candidate group being one or more candidates for the second part, wherein the first candidate group and the second candidate group are detected separately; and
identifying, by a computer processor, at least one of the first part in the first candidate group and the second part in the second candidate group by checking whether or not the second candidate group is present within a search range that is defined by using a reference location for the first candidate group as a base point.

11. The image processing method according to claim 10, further comprising:
storing a first feature amount model and a second feature amount model, the first feature amount model including a feature amount extracted in advance from the first part, the second feature amount model including a feature amount extracted in advance from the second part,
wherein the detecting includes:
detecting, as a part of the first candidate group, an object contained in the image and having a similarity to the first feature amount model which is equal to or more than a preset first threshold; and
detecting, as a part of the second candidate group, an object contained in the image and having a similarity to the second feature amount model which is equal to or more than a preset second threshold.

12. The image processing method according to claim 11,
wherein the storing includes storing the first feature amount model and the second feature amount model that are based on a histogram oriented gradients (HOG) feature amount or a local binary patterns (LBP) feature amount, and
wherein the detecting includes detecting the first candidate group and the second candidate group by using the HOG feature amount or the LBP feature amount.

13. The image processing method according to claim 12,
wherein the detecting includes detecting the first candidate group and the second candidate group by further using a color feature amount.

14. The image processing method according to claim 11,
wherein the selecting includes determining a location of an end of the first part in the image.

15. The image processing method according to claim 10,
wherein the relative movable range is that an end of the first part is movably connected to a rim of the second part at a connecting point.

16. The image processing method according to claim 10,
wherein the checking includes referring to a table that stores the search range and the reference location which are associated with each other, and the table stores an angle search range and a reference angle which are associated with each other and a scale search range and a reference scale which are associated with each other.

17. The image processing method according to claim 10, further comprising:
acquiring an image containing the first part and the second part of the user;
wherein the first part is a finger, and the second part is a back or palm of a hand.

18. The image processing method according to claim 10,
wherein if the first part includes a plurality of first parts and each of the plurality of first parts has an end connected to a rim of the second part, the selecting includes selecting the plurality of first parts, as the first part corresponding to the second part.

19. A non-transitory computer-readable storage medium storing an image processing program that causes a computer to execute a process comprising:
acquiring an image which contains a body part of a user and an object other than the body part, wherein the body part includes a first part and a second part which respectively connects at a joint of the user;
storing a first feature amount model and a second feature amount model, the first feature amount model including a feature amount individually extracted in advance from the first part, the second feature amount model including a feature amount individually extracted in advance from the second part,
detecting, by using the first feature amount model and the second feature amount model, a first candidate group and a second candidate group contained in the image, the first candidate group being one or more candidates for the first part, the second candidate group being one or more candidates for the second part, wherein the first candidate group and the second candidate group are detected separately; and
indentifying at least one of the first part in the first candidate group and the second part in the second candidate group by checking whether or not the second candidate group is present within a search range that is defined by using a reference location for the first candidate group as a base point.

* * * * *